United States Patent
Line et al.

(10) Patent No.: US 11,014,479 B1
(45) Date of Patent: May 25, 2021

(54) ARTICULATING FLEXMAT SEAT SUSPENSION

(71) Applicant: Ford Global Technologies, LLC, Dearborn, MI (US)

(72) Inventors: Johnathan Andrew Line, Northville, MI (US); Carol Casey, Dearborn, MI (US); Robert Damerow, Garden City, MI (US); Andrew Bernard Matusko, Dexter, MI (US); Spencer Robert Hoernke, Dundas (CA); S. M. Akbar Berry, Windsor (CA); Daniel Ferretti, Commerce Township, MI (US); Steven Carnago, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/668,403

(22) Filed: Oct. 30, 2019

(51) Int. Cl.
| *B60N 2/66* | (2006.01) |
| *B60N 2/02* | (2006.01) |
| *B60N 2/22* | (2006.01) |
| *B60R 16/03* | (2006.01) |
| *B60N 2/56* | (2006.01) |

(52) U.S. Cl.
CPC ......... *B60N 2/6671* (2015.04); *B60N 2/5657* (2013.01); *B60R 16/03* (2013.01)

(58) Field of Classification Search
CPC .......................... B60N 2/5657; B60N 2/6671
USPC ..... 297/180.1, 180.13, 180.14, 284.1, 284.2, 297/284.3, 284.4
See application file for complete search history.

(56) References Cited

U.S. PATENT DOCUMENTS

| 4,601,514 A | 7/1986 | Meiller | |
| 5,344,211 A | 9/1994 | Adat et al. | |
| 6,652,029 B2 | 11/2003 | McMillen | |
| 7,780,233 B2 * | 8/2010 | McMillen | B60N 2/6673 297/284.4 |
| 2006/0087160 A1 * | 4/2006 | Dong et al. | B60N 2/5692 297/180.13 |

* cited by examiner

*Primary Examiner* — Rodney B White
(74) *Attorney, Agent, or Firm* — David Coppiellie; Price Heneveld LLP (57) ABSTRACT

A vehicle seating assembly includes a frame, a front closeout panel supported on the frame and an articulating flexmat assembly operably coupled with at least one of the front closeout panel and the frame. The articulating flexmat assembly includes an upper flexmat extending from a first side of the frame to a second side of the frame. The upper flexmat includes an upper cable coupled with the upper flexmat and an upper cable regulating motor operably coupled with the upper cable. The articulating flexmat assembly also includes a lower flexmat extending from the first side of the frame to the second side of the frame. The lower flexmat includes a lower cable coupled with the lower flexmat and a lower cable regulating motor operably coupled with the lower cable.

19 Claims, 7 Drawing Sheets

ARTICULATING FLEXMAT SEAT SUSPENSION

FIELD OF THE DISCLOSURE

The present disclosure generally relates to a seat suspension, and more specifically, to an adjustable articulating flexmat seat suspension.

BACKGROUND OF THE DISCLOSURE

As the need for improved vehicle efficiency continues to increase, so too does the interest in versatile seat comfort components that are lightweight and which have a lean profile.

SUMMARY OF THE DISCLOSURE

According to one aspect of the present disclosure, a vehicle seating assembly includes a frame, a front closeout panel supported on the frame and an articulating flexmat assembly operably coupled with at least one of the front closeout panel and the frame. The articulating flexmat assembly includes an upper flexmat extending from a first side of the frame to a second side of the frame. The upper flexmat includes an upper cable coupled with the upper flexmat and an upper cable regulating motor operably coupled with the upper cable. The upper flexmat is adjustable by the upper cable regulating motor that retracts the upper cable to shift the upper flexmat outward. The articulating flexmat assembly also includes a lower flexmat extending from the first side of the frame to the second side of the frame. The lower flexmat includes a lower cable coupled with the lower flexmat and a lower cable regulating motor operably coupled with the lower cable. The lower flexmat is adjustable by the lower cable regulating motor that retracts the lower cable to shift the lower flexmat outward.

Embodiments of the first aspect of the disclosure can include any one or a combination of the following features:
- a blower motor coupled with the articulating flexmat assembly;
- wherein the upper flexmat and the lower flexmat are coupled with a living hinge and the living hinge enables the upper flexmat and the lower flexmat to be adjusted in forward and rearward directions independently of one another;
- wherein the articulating flexmat assembly is coupled to an inner surface of the front closeout panel;
- wherein the upper flexmat is disposed proximate a thoracic region and the lower flexmat is disposed proximate a lumber region;
- wherein at least one of the upper flexmat and the lower flexmat includes multiple undulating flex segments configured to aid in flexure of the at least one of the upper flexmat and the lower flexmat;
- wherein the upper cable and the lower cable are disposed horizontally on the frame;
- wherein the upper flexmat and the lower flexmat are constructed of a polymeric composite material;
- wherein the upper cable regulating motor and the lower cable regulating motor are disposed behind the upper flexmat and the lower flexmat, respectively;
- wherein the upper cable motor and the lower cable motor operate independently of one another;
- wherein the upper flexmat and the lower flexmat are coupled to a cushion assembly; and
- wherein each of the upper flexmat and the lower flexmat include straps that attach to one of the front closeout panel and the frame.

According to another aspect of the present disclosure, a seating assembly includes a frame, a front closeout panel supported on the frame and an articulating flexmat assembly operably coupled with at least one of the front closeout panel and the frame. The articulating flexmat assembly includes a flexmat extending across the frame and a cable coupled with the flexmat. A cable regulating motor is operably coupled with the cable and the flexmat is adjustable by the cable regulating motor. The cable regulating motor retracts the cable to shift the flexmat outward and extends the cable to draw the flexmat inward.

Embodiments of the second aspect of the disclosure can include any one or a combination of the following features:
- wherein the flexmat includes multiple undulating flex segments configured to aid in flexure of the flexmat;
- wherein the flexmat is coupled to a cushion assembly; and
- wherein the flexmat includes straps that attach to one of the front closeout panel and the frame.

According to yet another aspect of the present disclosure, an articulating flexmat assembly for a seatback includes an upper flexmat including an upper cable and an upper cable regulating motor. The upper flexmat is adjustable by the upper cable regulating motor to shift the upper flexmat outward and draw the upper flexmat inward. The articulating flexmat assembly also includes a lower flexmat including a lower cable and a lower cable regulating motor. The lower flexmat is adjustable by the lower cable regulating motor to shift the lower flexmat outward and draw the lower flexmat inward.

Embodiments of the third aspect of the disclosure can include any one or a combination of the following features:
- wherein the upper cable regulating motor and the lower cable regulating motor are disposed behind the upper flexmat and the lower flexmat, respectively;
- wherein the upper flexmat and the lower flexmat are coupled with a living hinge; and
- wherein each of the upper flexmat and the lower flexmat include straps that attach to one of the front closeout panel and the frame.

These and other aspects, objects, and features of the present disclosure will be understood and appreciated by those skilled in the art upon studying the following specification, claims, and appended drawings.

DETAILED DESCRIPTION

Figures 1, 2:
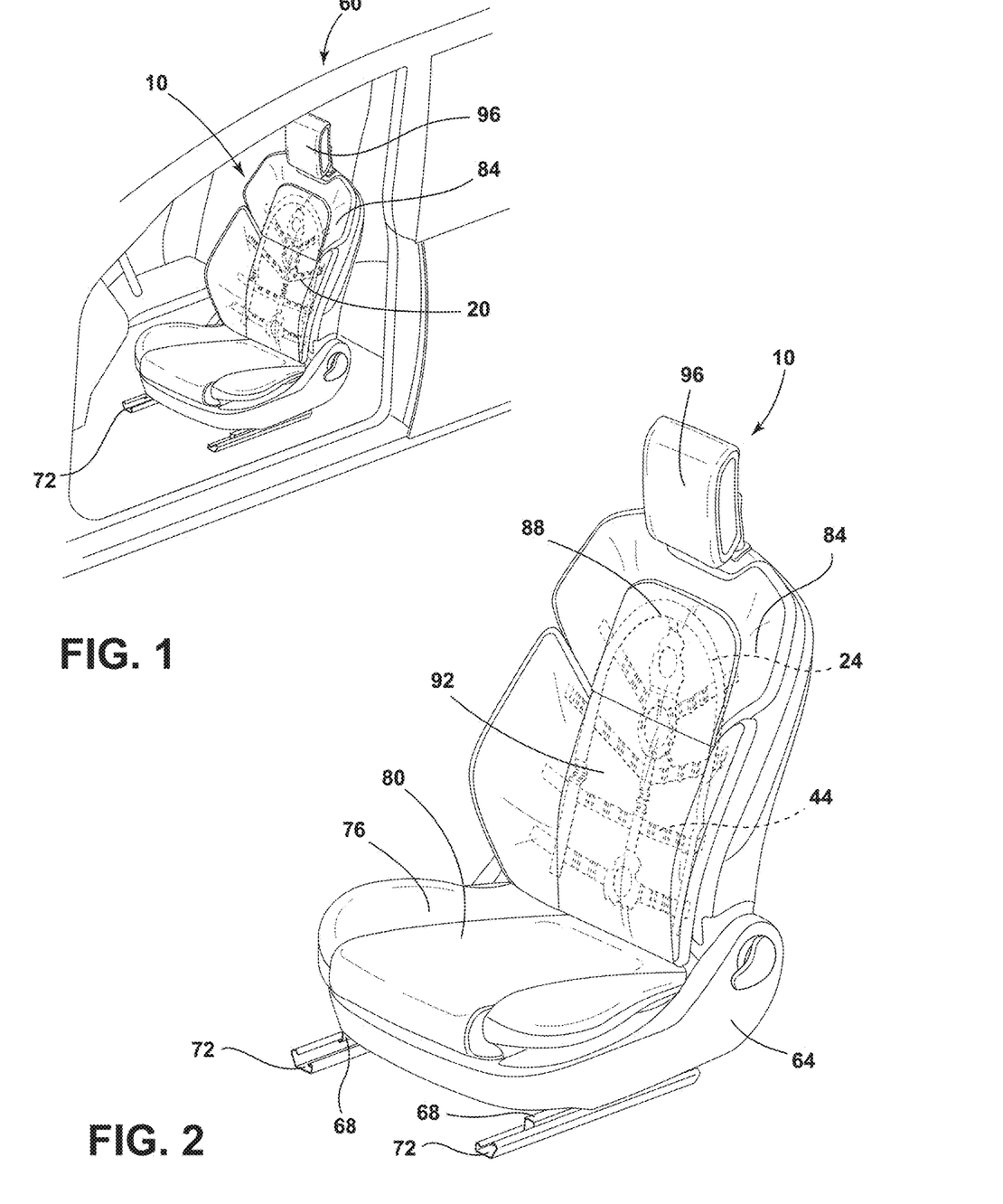
FIG. 1 is a top perspective view of a seating assembly, of the present disclosure, positioned inside a vehicle.
FIG. 2 is a top perspective view of the vehicle seating assembly of FIG. 1.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 3:
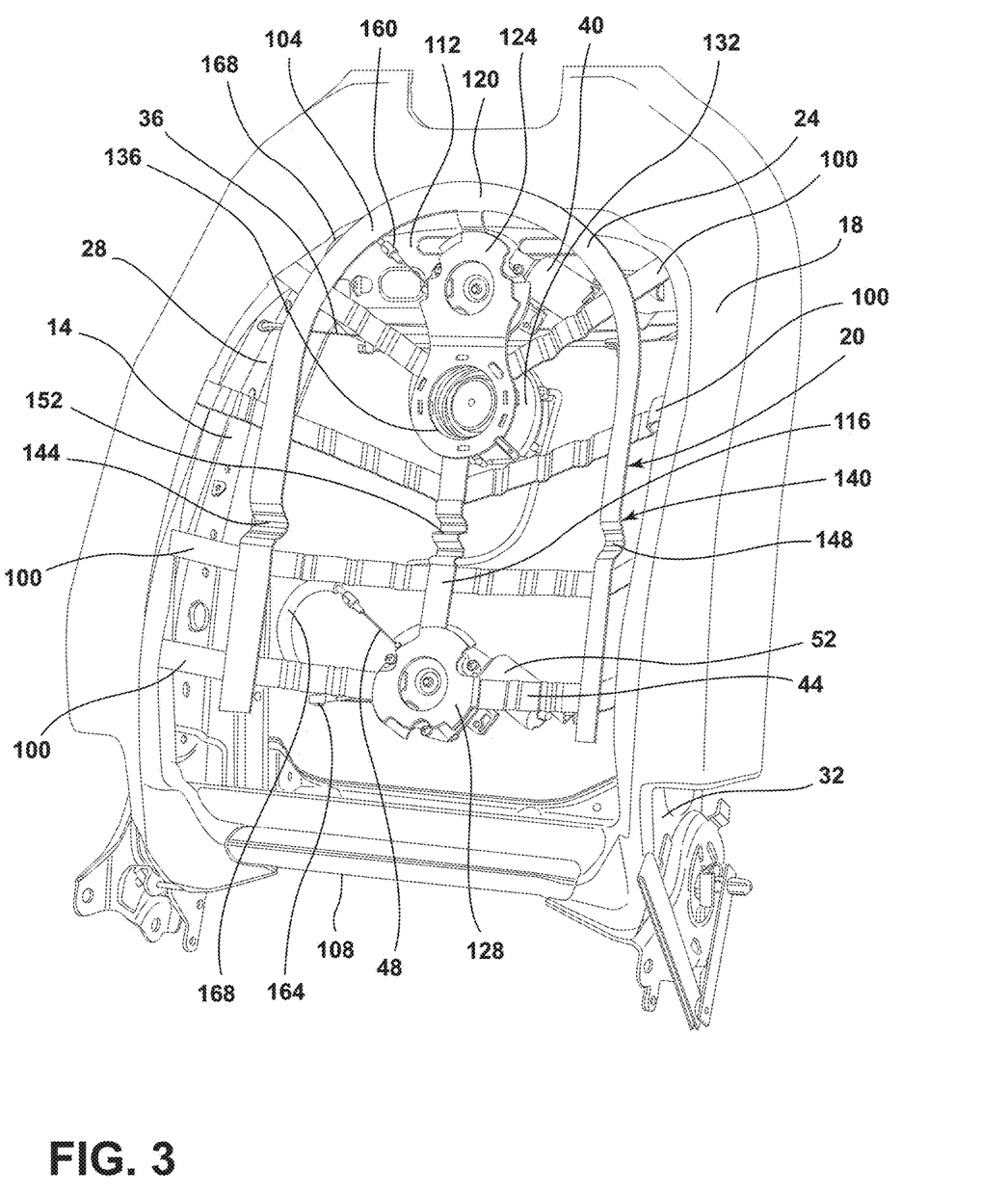
FIG. 3 is a front perspective view of an articulating flexmat assembly according to various aspects described herein.

Referring to FIGS. 1-3, reference number 10 generally designates a vehicle seating assembly including a frame 14 and a front closeout panel 18 supported on the frame 14. An articulating flexmat assembly 20 may be operably coupled with at least one of the front closeout panel 18 and the frame 14. The articulating flexmat assembly 20 may include an upper flexmat 24 extending from a first side 28 of the frame 14 to a second side 32 of the frame 14. The upper flexmat 24 may include an upper cable 36 coupled with the upper flexmat 24 and an upper cable regulating motor 40 operably coupled with the upper cable 36. The upper flexmat 24 may be adjustable by the upper cable regulating motor 40 that retract the upper cable 36 to shift the upper flexmat 24 outward. The articulating flexmat assembly 20 may also include a lower flexmat 44 extending from the first side 28 of the frame 14 to the second side 32 of the frame 14. The lower flexmat 44 may include a lower cable 48 coupled with the lower flexmat 44 and a lower cable regulating motor 52 operably coupled with the lower cable 48. The lower flexmat 44 may be adjustable by the lower cable regulating motor 52 that retracts the lower cable 48 to shift the lower flexmat 44 outward.

With reference to FIGS. 1 and 2, the vehicle seating assembly 10 may be used in any vehicle 60, such as a car, a truck, a van, etc. It is also contemplated that the concept set forth in this disclosure may be utilized in a front or forward position of the vehicle 60 as well as a rear or rearward position of the vehicle 60. The vehicle seating assembly 10, as illustrated, includes the frame 14 (FIG. 3) and a seat base 64 that may be positioned on rail slides 68 that slide on rails 72 to allow fore and aft movement of the vehicle seating assembly 10 relative to the vehicle 60. A seat 76 is operably coupled with the seat base 64 and may be movable relative thereto. The seat 76 includes a cushion assembly 80 supported thereon, and which defines a seating surface. In addition, a seatback 84 of the vehicle seating assembly 10 includes an upper thoracic region 88 and a lower lumbar region 92 as well as a head restraint 96. Each of the components of the seatback 84 may be configured for adjustability to properly support the weight of various occupants of various sizes inside the vehicle 60.

The seating assembly 10 as set forth herein utilizes the articulating flexmat assembly 20 which also acts as a suspension within the seating assembly 10. Accordingly, traditional foam and wire suspension components can be removed, thereby reducing weight and assembly processes during construction of the seating assembly 10. In addition, the seating assembly 10, as set forth herein, provides improved comfort.

With reference again to FIGS. 1 and 2, the seatback 84 includes the upper flexmat 24 and the lower flexmat 44. The upper flexmat 24 is disposed proximate the upper thoracic region 88, while the lower flexmat 44 is disposed proximate the lower lumbar region 92. In some examples, the seat 76 may also include a seat articulating flexmat assembly which is operable between the flexed and unflexed conditions and may be substantially similar to the articulating flexmat assembly 20. In further examples, the seat articulating flexmat assembly may be substantially similar to one of the upper flexmat 24 and the lower flexmat 44.

With reference now to FIG. 3, the articulating flexmat assembly 20 is illustrated as coupled to the front closeout panel 18. The upper flexmat 24 and the lower flexmat 44 may include straps 100 generally extending from the first side 28 of the frame 14 to the second side 32 of the frame 14. In some examples, the articulating flexmat assembly 20 includes four straps 100 vertically spaced about the frame 14. The straps 100 may include a single piece, or multiple pieces. A perimeter band 104 may be coupled with the straps 100 and may provide additional support and surface area for the articulating flexmat assembly 20. The perimeter band 104 may be generally U-shaped and may extend from a bottom 108 of the frame 14 near the first side 28 around a top 112 of the frame 14 and down to the bottom 108 of the frame 14 near the second side 32. It is also contemplated that the perimeter band 104 is oval shaped, thereby forming a closed perimeter around the straps 100. However, the perimeter band 104 can be in any suitable configuration, which may include multiple more than one piece and may not extend around the top 112 of the frame 14. Furthermore, the articulating flexmat assembly 20 may further include a central band 116, which may extend from a top 120 of the perimeter band 104 to the strap 100 closest to the bottom 108 of the frame 14.

Additionally, the articulating flexmat assembly 20 may include an upper ring portion 124 and a lower ring portion 128 configured to couple the upper cable regulating motor 40 and the lower cable regulating motor 52, respectively. In some examples, the upper ring portion 124 and the lower ring portion 128 are integral with, or coupled to, the central band 116. Furthermore, the upper ring portion 124 and the lower ring portion 128 may include molded in attachment features to connect the upper cable regulating motor 40 and the lower cable regulating motor 52, respectively to the articulating flexmat assembly 20. The upper cable regulating motor 40 and the lower cable regulating motor 52 may be disposed behind the upper flexmat 24 and the lower flexmat 44, respectively.

Still referring to FIG. 3, the seating assembly 10 may include a blower motor 132 coupled with the articulating flexmat assembly 20 to provide airflow to the seating assembly 10. A central ring portion 136 of the articulating flexmat assembly 20 may be provided to couple the blower motor 132. The central ring portion 136 may be disposed along the central band 116 between the upper ring portion 124 and the lower ring portion 128. In some examples, the central ring portion 136 is integral with the central band 116, which may include being integral with the upper ring portion 124 of the upper flexmat 24. Furthermore, the seating assembly 10 may include more than one blower motor 132 and therefore, more than one ring portion 136 to couple the blower motors 132 to the articulating flexmat assembly 20.

The articulating flexmat assembly 20 may include living hinges 140 configured to allow an angle of rotation between the upper flexmat 24 and the lower flexmat 44. In some examples, the perimeter band 104 may include first and second hinges 144, 148 disposed adjacent the first side 28 and second side 32 of the frame 14, respectively. Additionally, the central band 116 may include a central hinge 152 positioned between the upper ring portion 124 and the lower ring portion 128.

Figure 4:
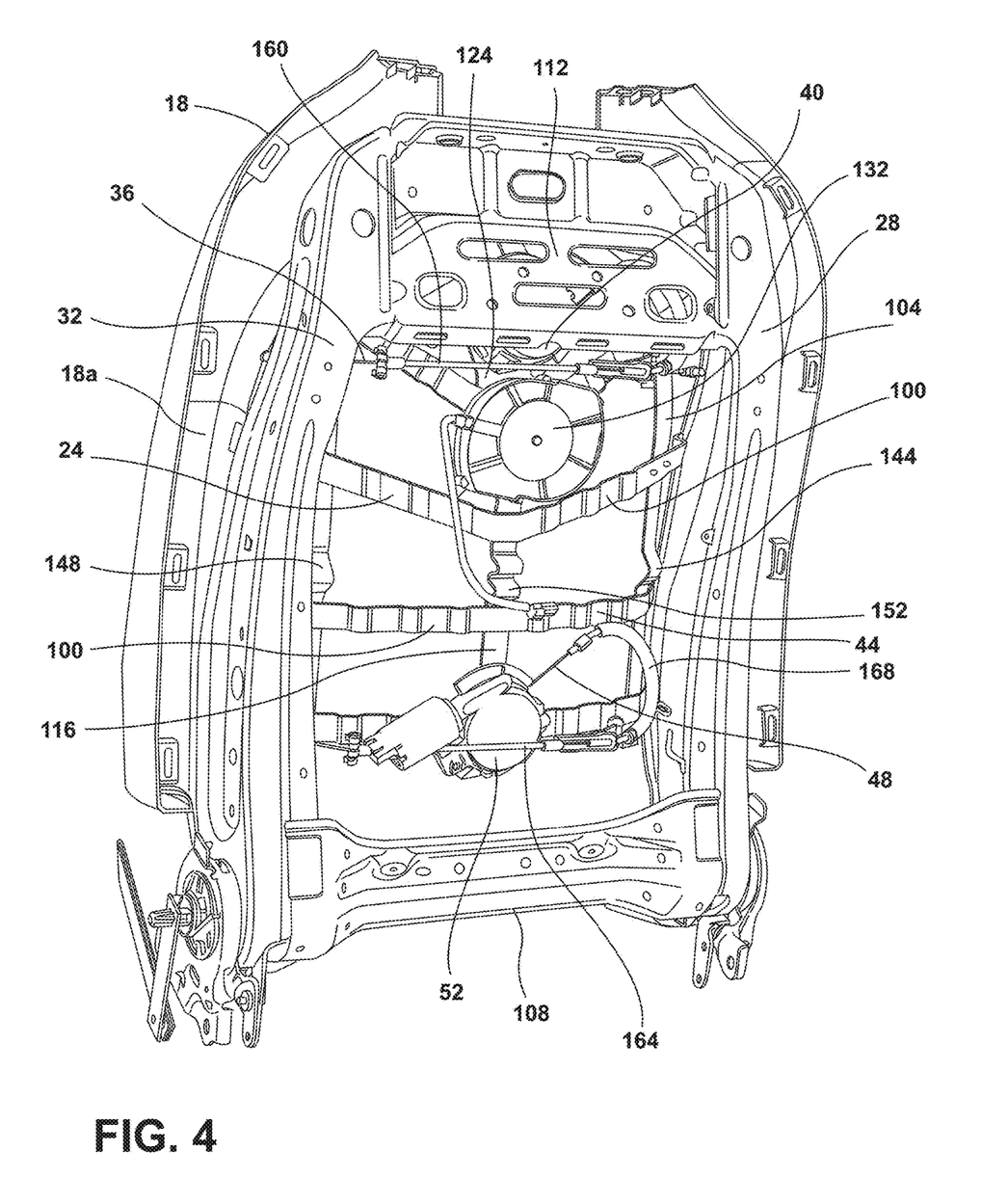
FIG. 4 is a rear perspective view of the articulating flexmat assembly of FIG. 3.

Referring now to FIG. 4, the upper cable 36 and the lower cable 48 are illustrated more clearly. An upper cable sheath 160 and a lower cable sheath 164 may encase the upper cable 36 and the lower cable 48 to provide rigidity and support to the upper and lower cables 36, 48, respectively. The upper and lower cables 36, 48 may be disposed horizontally on the frame 14 such that the upper and lower cables 36, 48 each generally extend from the first side 28 to the second side 32 of the frame 14. In some examples, one end of each of the upper and lower cables 36, 48 may attach to the frame 14 on one side, such as the side 32 in FIG. 4, while the other end of each of the upper and lower cables 36, 48 may be disposed within the upper cable regulating motor 40 and the lower cable regulating motor 52, respectively. In this way, the upper and lower cable sheaths 160, 164 may attach to the frame on the other side, such as the side 28 in FIG. 4 in order to position the cables 36, 48 across the frame 14. Furthermore, the upper cable sheath 160 and a lower cable sheath 164 may each include a curved portion 168 to guide the upper and lower cables 36, 48 into the upper cable regulating motor 40 and the lower cable regulating motor 52, respectively.

Still referring to FIG. 4, the straps 100 may couple to an inner surface 18a of the front closeout panel 18. In some examples, the inner surface 18a may include molded attachment features to attach components of the articulating flexmat assembly 20, which may include ends of the straps 100. However, it is within the scope of the disclosure to couple the articulating flexmat assembly 20 with any suitable component of the seating assembly 10, which may include the front closeout panel 18 and/or the frame 14. Furthermore, any suitable technique may be employed to couple the articulating flexmat assembly 20 with the seating assembly 10, which may include fasteners, adhesives and the like.

Figures 5A, 5B:
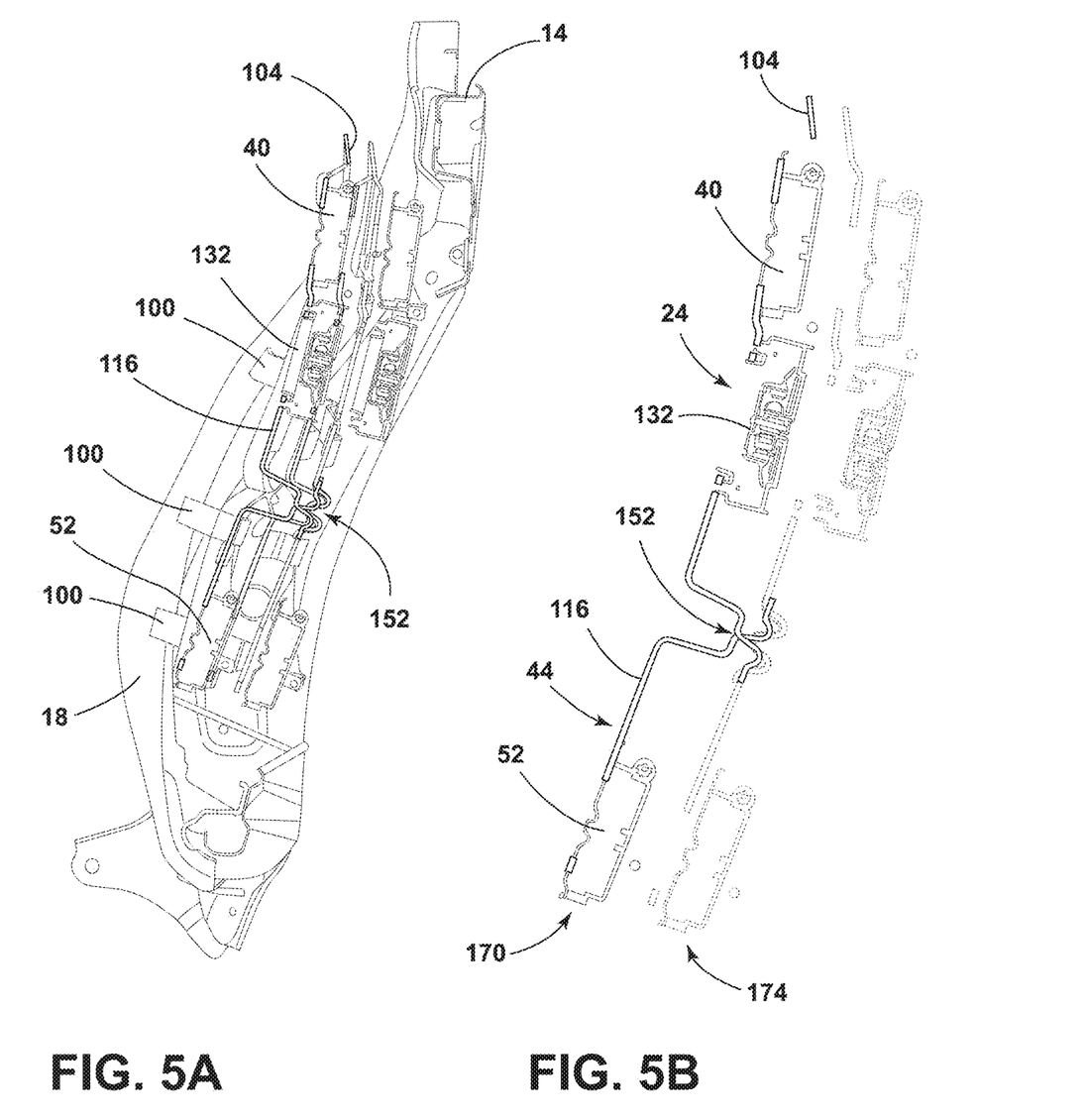
FIG. 5A is a side elevational cross-sectional view of multiple positions of the articulating flexmat assembly of FIG. 3.
FIG. 5B is a side elevational schematic view of the articulating flexmat assembly of FIG. 5A.

FIG. 5A illustrates a centerline cross-sectional view of multiple positions of the articulating flexmat assembly 20. The cable regulating motors 40, 52 are operably coupled with the upper and lower cables 36, 48 to adjust the articulating flexmat assembly 20. The upper cable regulating motor 40 and the lower cable regulating motor 52 may be in the form of electric motors that operate independently of one another to retract and extend the upper and lower cables 36, 48, respectively. In some examples, retracting the upper and lower cables 36, 48 includes winding the cables within the cable regulating motors 40, 52. The upper and lower cables 36, 48 may retract to shift the articulating flexmat assembly 20 outward and extend to draw the articulating flexmat assembly 20 inward. Thus, the articulating flexmat assembly 20 may be adjusted to regulate suspension firmness for upper thoracic support and lower lumbar support.

Turning to FIG. 5B, a fully forward position 170 may include the upper flexmat 24 and the lower flexmat 44 both shifted outward, while a fully rearward position 174 may include the upper flexmat 24 and the lower flexmat 44 both drawn inward. In this way, both the upper cable regulating motor 40 and the lower cable regulating motor 52 retract the cables 36, 48 to shift the articulating flexmat assembly 20 to the fully forward position 170 and extend the cables 36, 48 to shift the articulating flexmat assembly 20 to the fully rearward position 174. While FIG. 5B illustrates the fully forward position 170 and the fully rearward position 174, it is possible for the articulating flexmat assembly to be shifted outward and drawn inward to any position in between the fully forward position 170 and the fully rearward position 174 by selectively retracting and extending the upper and lower cables 36, 48, which may include a mid, or design, position. Furthermore, as the upper cable regulating motor 40 and the lower cable regulating motor 52 may operate independently of one another, the upper flexmat 24 and the lower flexmat 44 may be individually adjusted in forward and rearward directions to provide a wide range of adjustment positions for the articulating flexmat assembly 20 within the seating assembly 10.

Figure 6A:
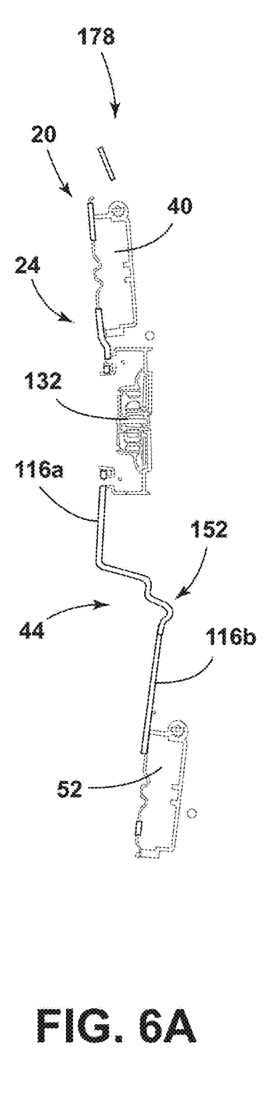
FIG. 6A is a side elevational schematic view of an articulating flexmat assembly according to various aspects described herein.
Figures 6B, 6C:
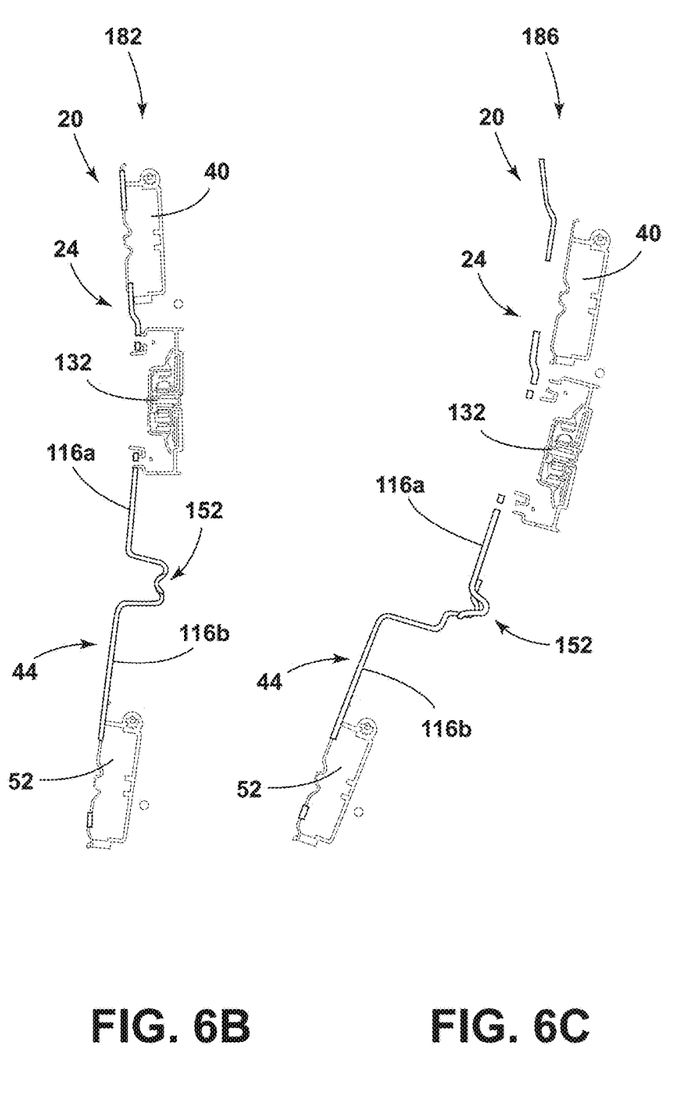
FIG. 6B is a side elevational schematic view of an articulating flexmat assembly according to various aspects described herein.
FIG. 6C is a side elevational schematic view of an articulating flexmat assembly according to various aspects described herein.

FIG. 6A illustrates a first position 178 where the upper flexmat 24 is shifted outwardly and the lower flexmat 44 is retracted rearward. The central hinge 152 is flexible to accommodate the first position 178. In some examples, the central band 116 includes an upper band 116a and a lower band 116b that join to form the central hinge 152. FIG. 6B illustrates a second, or mid, position 182 where the upper flexmat 24 and the lower flexmat 44 are neither shifted outwardly nor retracted rearward, which may be considered a neutral position. Additionally, FIG. 6C illustrates a third position 186 where the upper flexmat 24 is retracted rearward and the lower flexmat 44 is shifted outwardly. Again, the central hinge 152 is flexible to accommodate the third position 186. The first, second and third positons 178, 182 and 186 are exemplary positions. It is within the scope of the disclosure for the articulating flexmat assembly 20 to be arranged in any combination of positions adjustable by the upper cable regulating motor 40 and the lower cable regulating motor 52.

Figure 7:
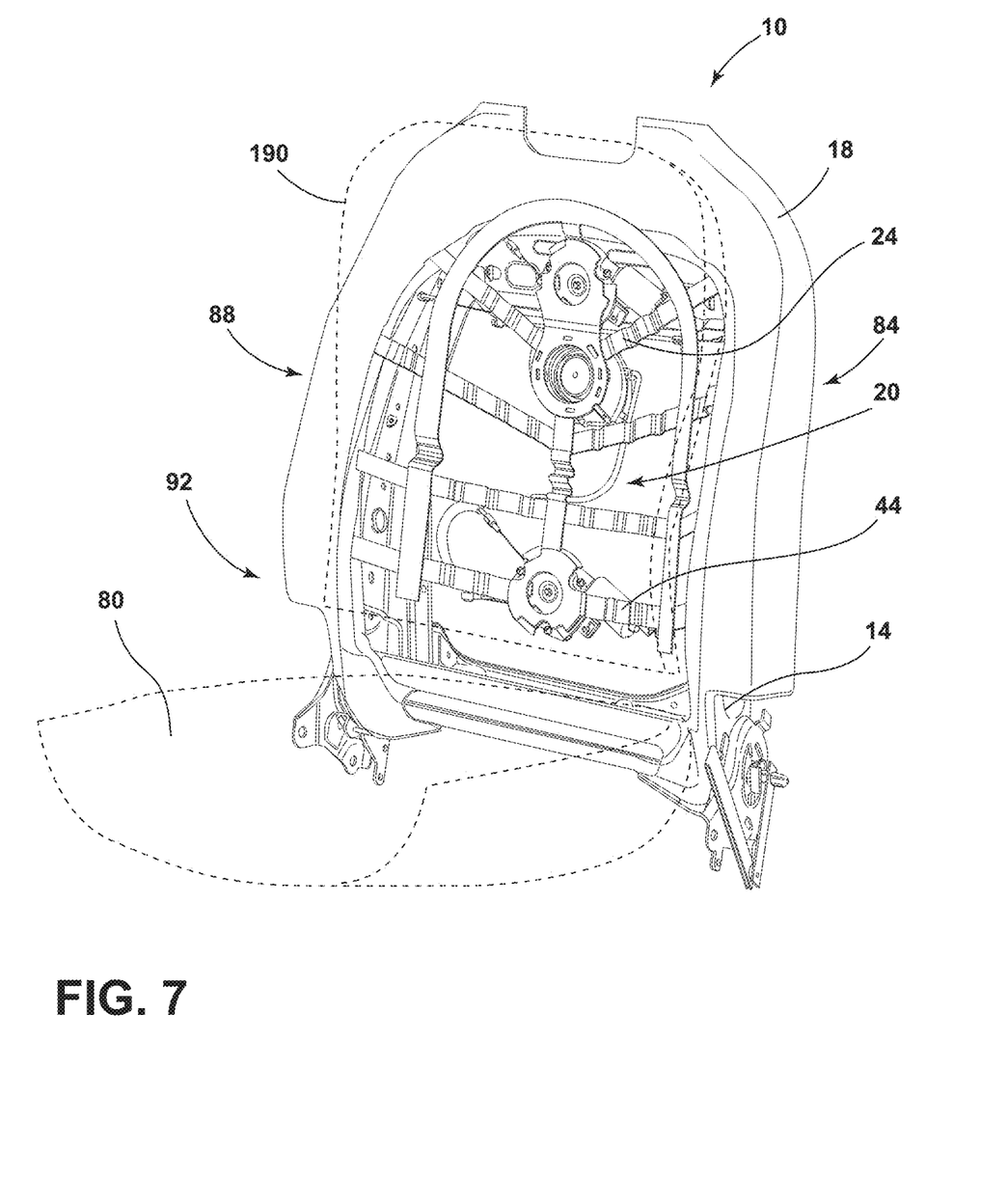
FIG. 7 is a front perspective view of an articulating flexmat assembly according to various aspects described herein.

With reference now to FIG. 7, the vehicle seating assembly 10 may include a cushion assembly 190 defining a seatback surface. The cushion assembly 190 may be coupled to the articulating flexmat assembly 20 to provide upper thoracic 88 support and lower lumbar 92 support. In this way, the upper flexmat 24 may provide suspension firmness for the upper thoracic region 88 while the lower flexmat 44 provides suspension firmness for the lower lumbar region 92.

Figure 8:
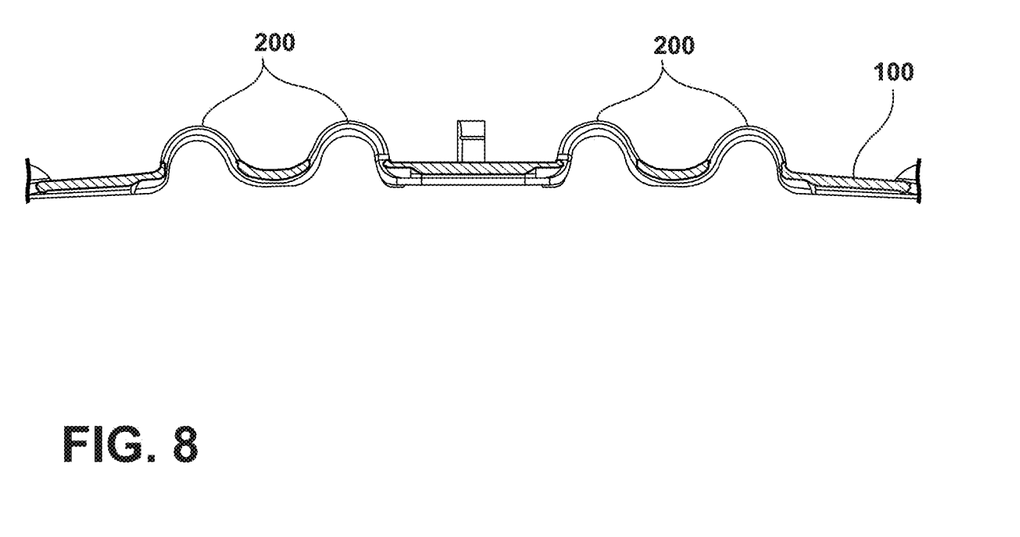
FIG. 8 is a side cross-sectional view of a portion of a flexmat of the present disclosure.

As shown in FIG. 8, the details of each of the first and second upper and lower flexmats 24, 44 may include semicircular, or undulating, members 200 that enable up, down, and cross-car flexure. In some examples, the members 200 are provided on the straps 100. However, it is within the scope of the disclosure for the members 200 to be provided on any suitable location of the articulating flexmat assembly 20. This construction provides for increased comfort. In addition, it will be understood that the first and second upper and lower flexmats 24, 44 may be configured to protrude outwardly in a flexed state toward the occupant by way of cable regulation or may be configured to cave inward by way of cable regulation away from the occupant. The first and second upper and lower flexmats 24, 44 are generally constructed of a plastic, or polymeric, composite material that does not take a set when in the same position for a long period of time. Accordingly, the first and second upper and lower flexmats 24, 44 may be used repeatedly with little or no wear.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle seating assembly comprising:
   a frame;
   a front closeout panel supported on the frame;
   an articulating flexmat assembly operably coupled with at least one of the front closeout panel and the frame and comprising:
      an upper flexmat extending from a first side of the frame to a second side of the frame and including:
         an upper cable coupled with the upper flexmat; and
         an upper cable regulating motor operably coupled with the upper cable, wherein the upper flexmat is adjustable by the upper cable regulating motor that retracts the upper cable to shift the upper flexmat outward; and
      a lower flexmat extending from the first side of the frame to the second side of the frame and comprising:
         a lower cable coupled with the lower flexmat; and
         a lower cable regulating motor operably coupled with the lower cable, wherein the upper flexmat and the lower flexmat are coupled with a living hinge and the lower flexmat is adjustable by the lower cable regulating motor that retracts the lower cable to shift the lower flexmat outward.

2. The vehicle seating assembly of claim 1, further comprising:
   a blower motor coupled with the articulating flexmat assembly.

3. The vehicle seating assembly of claim 1, wherein the living hinge enables the upper flexmat and the lower flexmat to be adjusted in forward and rearward directions independently of one another.

4. The vehicle seating assembly of claim 1, wherein the articulating flexmat assembly is coupled to an inner surface of the front closeout panel.

5. The vehicle seating assembly of claim 1, wherein the upper flexmat is disposed proximate a thoracic region and the lower flexmat is disposed proximate a lumber region.

6. The vehicle seating assembly of claim 1, wherein at least one of the upper flexmat and the lower flexmat includes multiple undulating flex segments configured to aid in flexure of the at least one of the upper flexmat and the lower flexmat.

7. The vehicle seating assembly of claim 1, wherein the upper cable and the lower cable are disposed horizontally on the frame.

8. The vehicle seating assembly of claim 1, wherein the upper flexmat and the lower flexmat are constructed of a polymeric composite material.

9. The vehicle seating assembly of claim 1, wherein the upper cable regulating motor and the lower cable regulating motor are disposed behind the upper flexmat and the lower flexmat, respectively.

10. The vehicle seating assembly of claim 1, wherein the upper cable regulating motor and the lower cable regulating motor operate independently of one another.

11. The vehicle seating assembly of claim 1, wherein the upper flexmat and the lower flexmat are coupled to a cushion assembly.

12. The vehicle seating assembly of claim 1, wherein each of the upper flexmat and the lower flexmat include straps that attach to one of the front closeout panel and the frame.

13. A seating assembly comprising:
a frame;
a front closeout panel supported on the frame;
an articulating flexmat assembly operably coupled with at least one of the front closeout panel and the frame and comprising:
  an upper flexmat extending across the frame and providing suspension firmness for an upper thoracic region;
  a cable coupled with the upper flexmat;
  a lower flexmat extending across the frame and providing suspension firmness for a lower lumbar region; and
  a cable regulating motor operably coupled with the cable, wherein the upper flexmat is adjustable by the cable regulating motor that retracts the cable to shift the upper flexmat outward and extends the cable to draw the upper flexmat inward.

14. The seating assembly of claim 13, wherein one of the upper flexmat and lower flexmat includes multiple undulating flex segments configured to aid in flexure of the one of the upper flexmat and lower flexmat.

15. The seating assembly of claim 13, wherein one of the upper flexmat and lower flexmat is coupled to a cushion assembly.

16. The seating assembly of claim 15, wherein the one of the upper flexmat and lower flexmat includes straps that attach to one of the front closeout panel and the frame.

17. An articulating flexmat assembly for a seatback comprising:
an upper flexmat including:
  an upper cable; and
  an upper cable regulating motor, wherein the upper flexmat is adjustable by the upper cable regulating motor to shift the upper flexmat outward and draw the upper flexmat inward; and
a lower flexmat including:
  a lower cable; and
  a lower cable regulating motor, wherein the upper flexmat and the lower flexmat are coupled with a living hinge and the lower flexmat is adjustable by the lower cable regulating motor to shift the lower flexmat outward and draw the lower flexmat inward.

18. The articulating flexmat assembly of claim 17, wherein the upper cable regulating motor and the lower cable regulating motor are disposed behind the upper flexmat and the lower flexmat, respectively.

19. The articulating flexmat assembly of claim 17, wherein each of the upper flexmat and the lower flexmat include straps that attach to one of a front closeout panel and a frame.

* * * * *